(12) United States Patent
Wilhelm

(10) Patent No.: US 7,337,599 B2
(45) Date of Patent: Mar. 4, 2008

(54) DEVICE FOR PROCESSING FODDER

(75) Inventor: Joel Wilhelm, Saint Louis (FR)

(73) Assignee: Kuhn S.A., Saverne (FR)

( * ) Notice: Subject to any disclaimer, the term of this patent is extended or adjusted under 35 U.S.C. 154(b) by 256 days.

(21) Appl. No.: 10/557,601

(22) PCT Filed: May 7, 2004

(86) PCT No.: PCT/FR2004/050183

§ 371 (c)(1),
(2), (4) Date: Nov. 22, 2005

(87) PCT Pub. No.: WO2004/105462

PCT Pub. Date: Dec. 9, 2004

(65) Prior Publication Data

US 2007/0068130 A1 Mar. 29, 2007

(30) Foreign Application Priority Data

May 23, 2003 (FR) .................... 03 06286

(51) Int. Cl.
*A01D 61/00* (2006.01)
(52) U.S. Cl. ................. 56/16.4 R; 56/16.4 A
(58) Field of Classification Search ............ 56/16.4 R, 56/16.4 A, DIG. 1, 14.5, 14.6, 16.4 C, 504, 56/505
See application file for complete search history.

(56) References Cited

U.S. PATENT DOCUMENTS

| | | | | |
|---|---|---|---|---|
| 3,092,946 A | | 6/1963 | Mathews | |
| 3,699,755 A | * | 10/1972 | Hauser | 56/16.4 R |
| 4,182,099 A | * | 1/1980 | Davis et al. | 56/16.4 R |
| 4,196,567 A | * | 4/1980 | Davis et al. | 56/13.7 |
| 4,233,803 A | * | 11/1980 | Davis et al. | 56/14.9 |
| 4,539,798 A | | 9/1985 | Klinner | |
| 4,720,962 A | * | 1/1988 | Klinner | 56/10.2 R |
| 4,799,352 A | * | 1/1989 | Amstutz | 56/364 |
| 5,894,716 A | | 4/1999 | Haldeman et al. | |
| 5,966,913 A | | 10/1999 | Neuerburg | |
| 6,029,432 A | * | 2/2000 | Kraus et al. | 56/16.4 B |
| 6,052,975 A | * | 4/2000 | Kraus et al. | 56/16.4 B |
| 6,058,689 A | * | 5/2000 | Kraus et al. | 56/16.4 B |
| 6,101,797 A | * | 8/2000 | Koegel et al. | 56/14.5 |
| 6,453,654 B1 | * | 9/2002 | Kraus et al. | 56/16.4 R |

FOREIGN PATENT DOCUMENTS

| | | |
|---|---|---|
| EP | 0 064 115 | 11/1982 |
| EP | 1 008 290 | 6/2000 |

* cited by examiner

*Primary Examiner*—Árpád Fábián Kovács
(74) *Attorney, Agent, or Firm*—Oblon, Spivak, McClelland, Maier & Neustadt, P.C.

(57) ABSTRACT

A device for processing fodder including a rotor driven in rotation about its longitudinal axis, a first guide element partially surrounding the rotor, a second guide element configured to occupy at least two positions relative to the rotor, a first control member configured to move the first guide element into at least two positions relative to the rotor and to hold the first guide element in these positions, a link between the first guide element and the second guide element so that a change of position of the first guide element modifies the position of the second guide element, and a second control member configured to dispose the second guide element according to the various configurations.

18 Claims, 4 Drawing Sheets

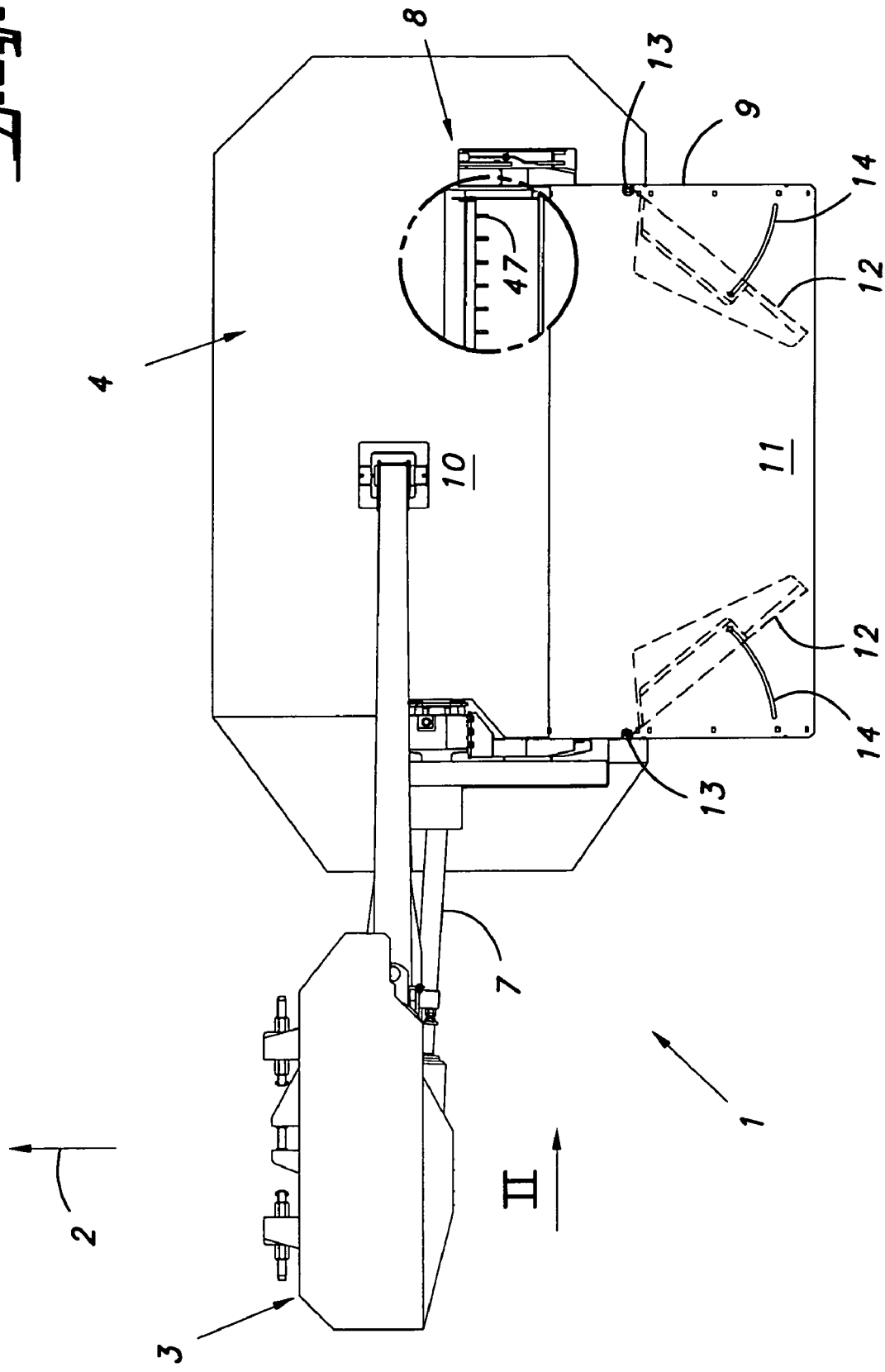

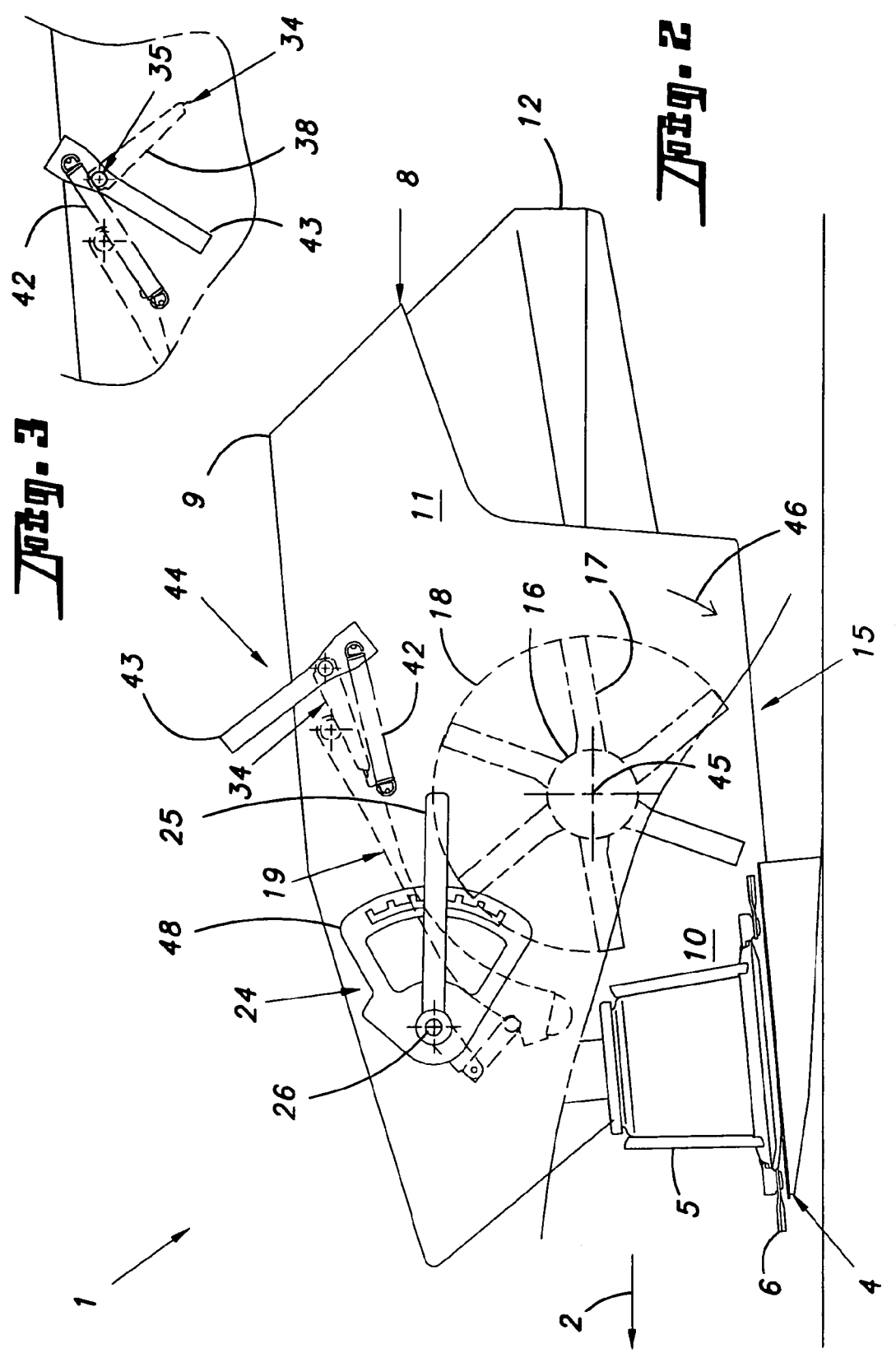

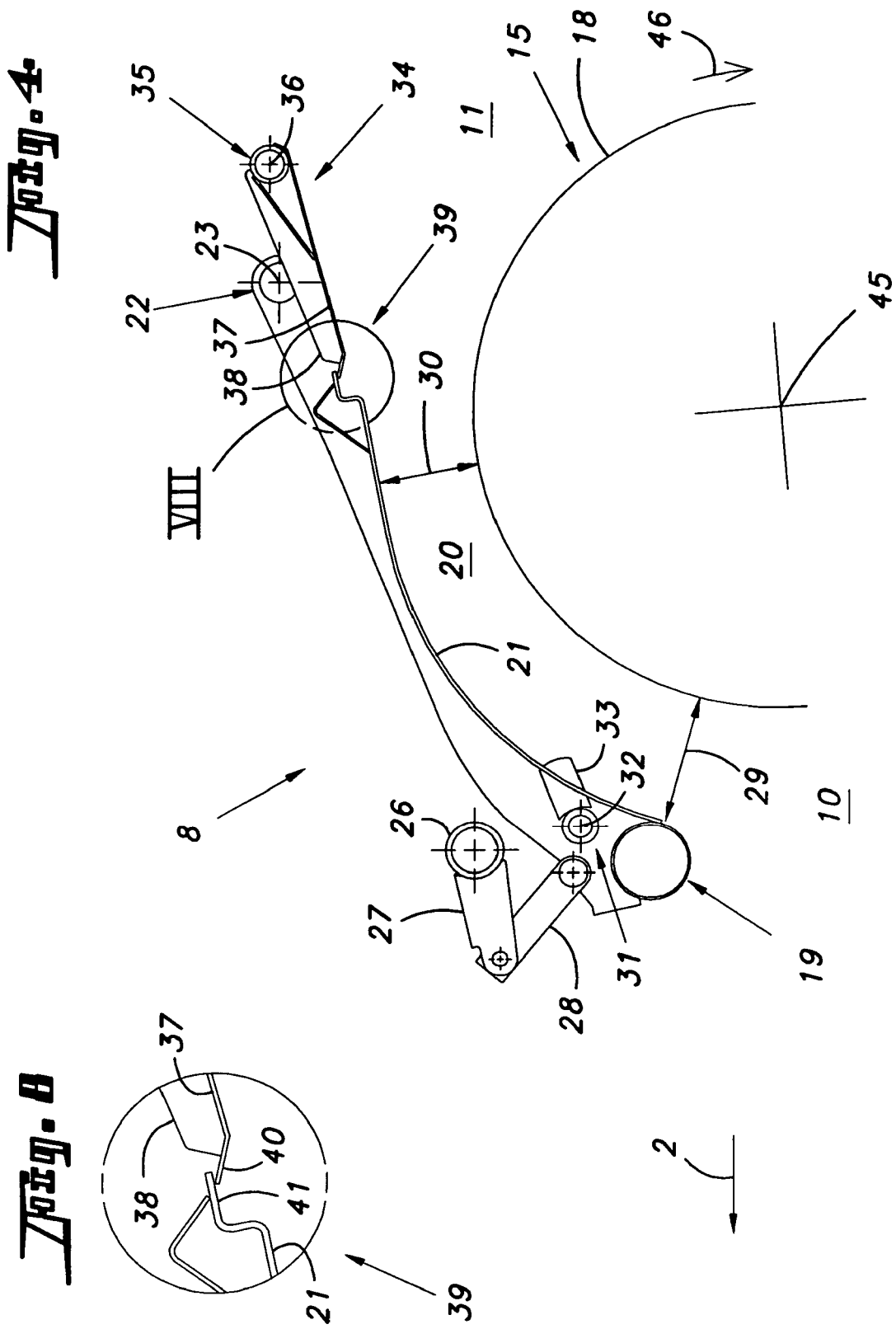

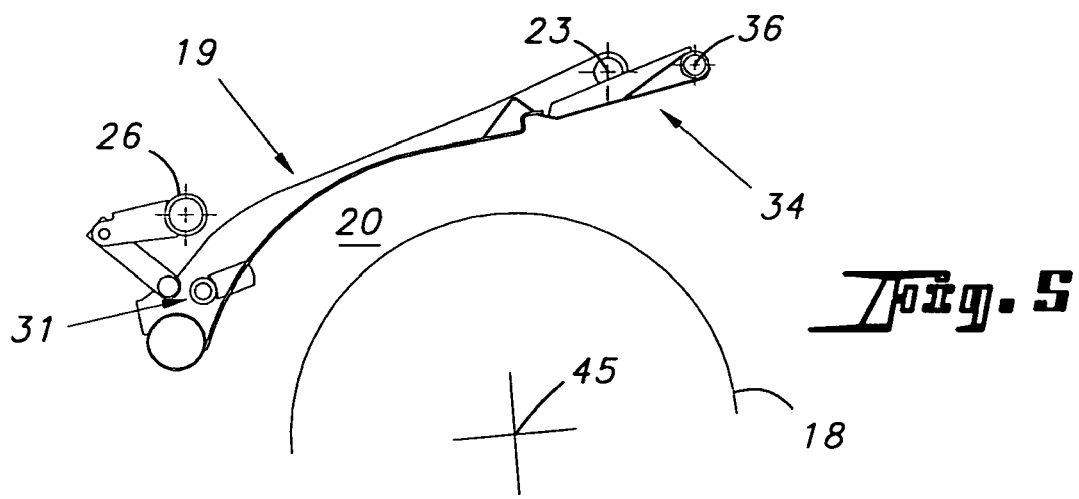
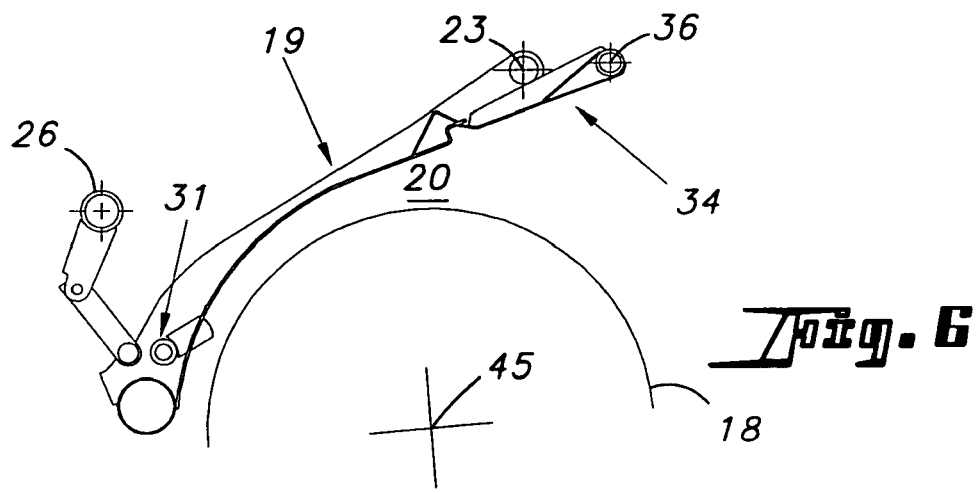
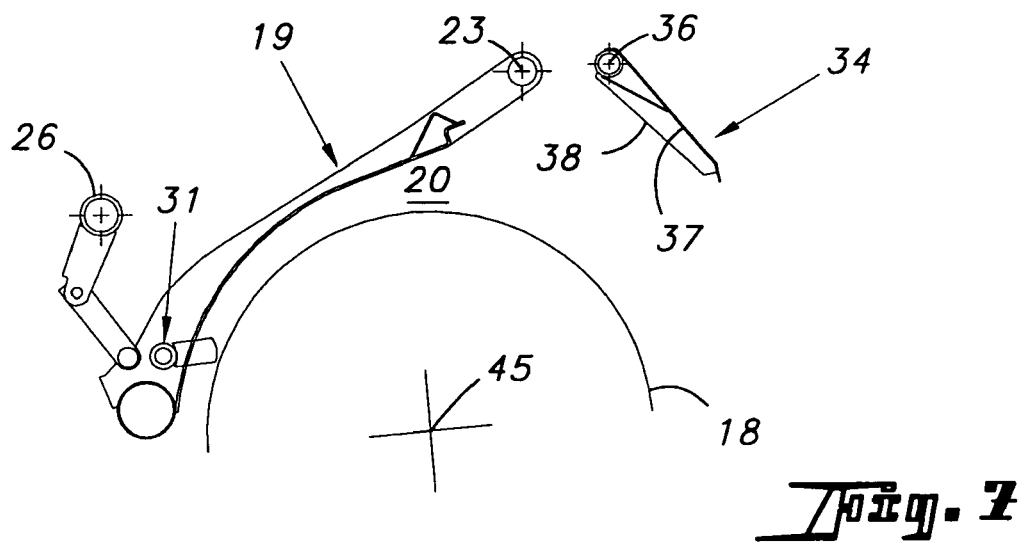

DEVICE FOR PROCESSING FODDER

The present invention relates to the general technical field of agricultural machinery. It relates more precisely to a device for processing fodder comprising:
- a casing provided with an inlet section and an outlet section for the fodder,
- a rotor connected to the casing, so as to be driven in rotation about a longitudinal axis in order to transport the fodder toward the outlet section,
- a first guide element partially surrounding the rotor so as to define a passage channel for the fodder, and
- a second guide element disposed so as to guide the flow of fodder leaving the passage channel, the second guide element being able to be disposed in at least two configurations relative to the rotor.

It is usual to equip an agricultural mower with such a device for processing fodder. Specifically, the device for processing fodder, still called a conditioner, advantageously makes it possible to reduce the time needed to dry the product cut by the mower. Document EP 1 008 290 A1 describes a mower comprising a cutting device intended to cut a standing product such as grass for example. This known mower also comprises a device for processing fodder placed behind the cutting device. This device for processing fodder comprises in its turn a rotor driven in rotation about a horizontal axis. Thus, during work, the fodder originating from the cutting mechanism is carried by the rotor along a conditioning metal sheet in order to be finally ejected toward the rear of the mower. The passage of the fodder against the conditioning metal sheet causes a fragmentation of the wax film covering the stems of the cut product. This fragmentation allows a faster evacuation of the humidity contained in the plant, hence faster drying. This known processing device also comprises a guiding metal sheet disposed further downstream of the conditioning metal sheet. This guiding metal sheet is connected to the walls of a casing in order to be able to occupy two positions in which it directs the flow of fodder differently.

The drawback of this device for processing fodder lies in the fact that the conditioning metal sheet occupies a single position relative to the rotor. The possibilities of adjusting the intensity of conditioning are therefore very limited. The user therefore does not have the option of conveniently adapting this known device to the various types and quantities of fodder that he may encounter.

Document EP 0 064 114 A1 describes another device for processing fodder. The latter also comprises a rotor driven in rotation and covered by a conditioning metal sheet. The position of this conditioning metal sheet relative to the rotor is adjustable this time. However, this prior document does not describe the use of a second metal sheet making it possible to guide the flow of fodder downstream of the conditioning metal sheet.

Document U.S. Pat. No. 4,539,798 describes a device for picking up cut products comprising a rotor housed in a structure consisting of side portions and a front cover. This cover forms with the rotor a channel for the passage of the products. It is made in one or two sections which extend practically in the extension of one another, the sections being movable in order to suit the mass of products that must pass through the channel. This device does not comprise means for adjusting the intensity of the processing of the fodder nor means for modifying the orientation of the flow of the products at the outlet.

The purpose of the present invention is to obtain a device for processing fodder with which the user has many possibilities for adjusting the intensity of conditioning, while avoiding disrupting the continuity of the flow of fodder and with which it is possible to simply and quickly modify the orientation of the flow of the fodder at the outlet of the rotor.

Consequently, the device for processing fodder according to the present invention is characterized in that a first control member is provided in order to move the first guide element into at least two positions relative to the rotor and to hold it in these positions, a link is provided between the first guide element and the second guide element, so that a change of position of the first guide element modifies, in its first configuration, the position of the second guide element and a second control member is provided to dispose the second guide element according to the various configurations.

The various positions of the first guide element advantageously make it possible to modify the distance and/or the orientation of the first guide element relative to the rotor. As a result, action is taken directly on the degree of fractioning of the fodder, hence on the intensity of conditioning. Thanks to the link provided, the position of the second guide element automatically adapts to the adjustment of the first guide element. Thus this adjustment does not cause any deviation or sudden change of direction in the trajectory defined by the guide elements. The flow of fodder therefore advantageously maintains an even discharge. The second control member makes it possible to place the second guide element in another configuration in which it modifies the direction of flow of products at the outlet of the rotor.

Other features of the invention, to be considered separately or in all their possible combinations, will further appear in the following description of a nonlimiting exemplary embodiment of the invention represented in the appended drawings in which:

FIG. 1 represents a top view of an agricultural mower according to the present invention, FIG. 2 represents a side view of the mower in the direction of the arrow II defined in FIG. 1, the second guide device being disposed according to a first configuration, FIG. 3 represents a portion of FIG. 2 showing the second guide device disposed according to a second configuration, FIG. 4 represents, seen from the side in the direction of arrow II and on another scale, a device for processing fodder according to the present invention, FIGS. 5 to 7 represent, seen from the side and on another scale, the device for processing fodder of FIG. 4 disposed in three different adjustment positions.

FIG. 8 represents an enlargement of zone VIII defined in FIG. 4.

FIG. 1 represents an agricultural mower (1) according to the present invention. The mower (1) is intended to be coupled to a motor vehicle (not shown) which moves it in a line and a direction of travel indicated by the arrow (2). In the rest of the description, the concepts "front" and "rear", "in front of" and "behind" are defined relative to the direction of travel (2) and the concepts "right" and "left" are defined when looking at the mower (1) from the rear in the direction of travel (2).

In a known manner, the mower (1) comprises a cutting device (4) intended to cut a standing product such as grass for example. The cutting device (4) is connected to the motor vehicle by means of a frame (3). The frame (3) advantageously makes it possible to bring the cutting device (4) from a working position to a transport position. In the working position as shown in FIG. 1, the cutting device (4) rests at least partially on the ground. Preferably, the frame (3) comprises means, for example springs, for transferring in working position at least a portion of the weight of the cutting device (4) to the motor vehicle. During work, the frame (3) also allows the cutting device (4) to follow the contours of the ground, independently of the position of the motor vehicle. Such a frame (3) is known to those skilled in the art, so it will not be described in greater detail.

For its part, the cutting device (4) comprises cutting members (5) disposed in a line at least substantially perpendicular to the line of travel (2). The cutting members (5) are visible in FIG. 2 thanks to a partial cutaway made in the cutting device (4). During work, each cutting member (5) is driven in rotation about a respective upwardly directed axis. Knives (6) connected to the periphery of the cutting members (5), thus describe circles at high speed and cut the standing product by impact. The cutting device (4) is driven by means of transmission elements (7) connected to a power-take-off of the motor vehicle. Other means for cutting the standing product may be used without, in any way, departing from the context of the present invention.

In an also known manner, the mower (1) additionally comprises a device for processing fodder (8) intended to accelerate the drying of the cut product. In the exemplary embodiment represented in the figures, the device for processing fodder (8) is disposed at the rear of the cutting device (4). Thus, advantageously, the fodder leaving the cutting device (4) directly feeds the device for processing fodder (8).

In the light of FIG. 2, the device for processing fodder (8) comprises a casing (9) connected to the cutting device (4). The casing (9) has an inlet section (10) situated behind the cutting device (4) and an outlet section (11) situated behind the mower (1).

In the exemplary embodiment represented in the figures, the outlet section (11) is advantageously provided with side deflectors (12) to create a calibrated windrow of cut and processed product. The orientation of the side deflectors (12) may be modified thanks to their pivoting mounting about a pivot (13) and a guide groove (14) represented in FIG. 1. The user may thus adjust the width of the windrow laid down on the ground.

The device for processing fodder (8) also comprises a rotor (15) designed to carry the fodder towards the outlet section (11). To do this, the rotor (15) consists of a shaft (16) mounted pivotingly in the casing (9) along a substantially horizontal axis (45) which is transversal to the direction of travel (2). During work, the arm (16) is driven in rotation directly or indirectly by the power-take-off of the motor vehicle by means of the transmission elements (7). The direction of rotation of the rotor (15) is represented in the figures by the arrow (46). The arm (16) is also provided with fingers (17) which extend during work radially outward defining a peripheral trajectory (18). The fingers (17) may have various shapes known to those skilled in the art. Preferably, a pivoting mounting of the fingers (17) on the shaft (16) allows the fingers (17) to retract at least partially if an obstacle or an abnormal quantity of fodder enters the device for processing fodder (8).

In the light particularly of FIG. 4, the device for processing fodder (8) according to the invention also comprises a first guide element (19) arranged opposite the rotor (15), so as to define a passage channel (20) for the fodder. The passage channel (20) is therefore located between an active surface (21) of the first guide element (19) and the peripheral trajectory (18) of the fingers (17). The active surface (21) advantageously has a profiled shape at least partially surrounding the peripheral trajectory (18). The conditioning of the fodder is caused by the impact of the fingers (17) and by its passage through the passage channel (20).

According to an important feature of the present invention, the first guide element (19) may occupy at least two positions relative to the rotor (15).

Thus, in the exemplary embodiment represented in the figures, the first guide element (19) is connected pivotingly to the casing (9) by means of an articulation (22) with an axis (23). The axis (23) is advantageously parallel to the axis of rotation (45) of the rotor (15). Also provided is a first control member (24) intended to pivot the first guide element (19) about the articulation (22) and hold it in various positions. Consequently, an action on the first control member (24) causes a modification of the section of the passage channel (20) and therefore a modification of the intensity of conditioning.

In the light of FIG. 2, the first control member (24) consists of a lever (25) connected pivotingly to the casing (9) by means of a shaft (26) disposed substantially parallel to the axis (45) of the rotor (15). Preferably the lever (25) may occupy various positions defined by a locating and locking member (48) rigidly connected to the casing (9). The lever (25) and the locating and locking member (48) are advantageously situated outside the casing (9) so as to be easy for the user to access. With reference more precisely to FIG. 4, the first control member (24) also consists of an arm (27) rigidly connected to the shaft (26). Also provided is a rod (28) connecting one end of the arm (27) to the first guide element (19) by means of pivot articulations. Consequently, any change of position of the lever (25) causes the first guide element (19) to pivot about the articulation (22).

Preferably, the articulation (22) is situated in a rear portion of the first guide element (19). In addition, the articulation (22) is advantageously disposed at the rear of and above the axis (45) of the rotor (15). The major advantage of such an arrangement of the articulation (22) can be seen in FIGS. 5 and 6. Specifically, FIG. 5 represents more precisely the first guide element (19) in a first position of adjustment relatively distant from the rotor (15). FIG. 6, on the other hand, represents the first guide element (19) in a second position of adjustment relatively close to the rotor (15). It can therefore be seen that the pivoting of the first guide element (19) has an influence both on the inlet opening (29) and on the outlet opening (30) of the passage channel (20). The change of conditioning intensity is therefore spread along the whole length of the passage channel (20). It goes without saying that the first guide element (19) may occupy different intermediate positions between the positions represented in FIGS. 5 and 6 in order to refine the adjustment of conditioning intensity.

In the exemplary embodiment represented in the figures, the device for processing fodder (8) also comprises a comb (31) articulated along an axis (32) situated outside the passage channel (20). As an example, FIG. 4 shows such a comb (31) comprising teeth (33) capable of engaging at least partially in the passage channel (20) through one or more slots (47) made in the first guide element (19). The slot or slots (47) are visible in FIG. 1 through a partial cutaway made in the device for processing fodder (8). In the light of FIG. 7, a more pronounced engagement of the comb (31) in the passage channel (20) advantageously increases conditioning intensity. Also provided are locking means for locking the comb (31) in a given position. The comb (31) therefore constitutes an additional possibility for the adjustment of conditioning intensity.

The comb (31) is articulated opposite to the slots (47) in order to block the slots (47) for each position of the teeth (33). The fodder thrown against the active surface (21), which has these slots (47), does not therefore enter into the slots (47) and consequently does not risk being caught therein.

The axis (32) connecting the comb (31) is advantageously integral with the first guide element (19). Thus, during the adjustment of conditioning intensity by means of the lever (25), the comb (31) is also pivoted about the articulation (22).

In a manner known to those skilled in the art, the device for processing fodder (8) further comprises a second guide element (34). The second guide element (34) is disposed downstream of the first guide element (19) so as to be able to guide the flow of fodder leaving the passage channel (20).

The second guide element (34) may advantageously occupy at least two positions relative to the rotor (15). Thus, in the exemplary embodiment shown in the figures, the second guide element (34) is connected pivotingly to the casing (9) by means of an articulation (35) with an axis (36). The axis (36) is advantageously parallel to the axis of rotation (45) of the rotor (15). Preferably, the articulation (35) is situated in a rear portion of the second guide element (34).

In a first configuration as shown in FIGS. 2, 4 and 6, the second guide element (34) is disposed in the extension of the first guide element (19). The flow of fodder thus continues being guided on the trajectory that it had when leaving the passage channel (20). This configuration of the second guide element (34) allows the fodder to reach the side deflectors (12) represented in FIG. 1. The fodder will then be deposited on the ground so as to form a windrow of calibrated width.

According to another important feature of the present invention, a link (39) is also provided between the first guide element (19) and the second guide element (34), so that any change of position of the first guide element (19) automatically modifies the position of the second guide element (34).

In the exemplary embodiment represented in the figures, the link (39) is advantageously made by abutting and holding the second guide element (34) against the first guide element (19).

Accordingly and with reference to FIG. 8, the second guide element (34) advantageously comprises a nose (40) intended to press against a support (41) made on the first guide element (19).

The nose (40) is held against the support (41) by means of an elastically deformable element (42). In the light of FIG. 2, the elastically deformable element (42) is connected to the casing (9). The elastically deformable element (42) is advantageously disposed so as to create a torque about the axis (36) so that, in the first configuration as represented in FIGS. 2, 4 and 6, the nose (40) is kept pressed against the support (41).

In the light of FIGS. 5 and 6, when the second guide element (34) is disposed in the first configuration, the elastically deformable element (42) allows to maintain the contact between the nose (40) and the support (41), irrespective of the adjustment position of the first guide element (19). The elastically deformable element (42) consequently causes a modification in the orientation of the second guide element (34) when the position of the first guide element (19) is changed. The second guide element (34) thus always remains in the extension of the first guide element (19), even when the latter pivots about the articulation (22). The result of this is that, in the first configuration of the second guide element (34) and irrespective of the adjustment of the first guide element (19), the flow of fodder advantageously does not deviate or suddenly change direction when it passes from the first guide element (19) to the second guide element (34).

Preferably, the nose (40) is disposed in a front portion of the second guide element (34). For its part, the support (41) is advantageously situated in front of the articulation (22) connecting the first guide element (19) to the casing (9). In addition, the support (41) is advantageously offset relative to the active surface (21), so as to come out of the passage channel (20). As a result, the link (39) does not disrupt the discharge of the flow of fodder.

In the light of FIGS. 3 and 7, the second guide element (34) may also be disposed according to a second configuration by means of a second control member (44). In this second configuration, the second guide element (34) is pivoted about the articulation (35) so as to be placed across the flow of fodder leaving the passage channel (20). An active surface (37) of the second guide element (34) then beats down the flow of fodder to the ground before the latter reaches the side deflectors (12). Thus the fodder is deposited on the ground without being grouped together. Preferably, the active surface (37) is provided with substantially vertical blades (38). The blades (38) advantageously make it possible to distribute the flow of fodder along the whole width of the mower (1). This allows, if necessary, to further accelerate the drying of the fodder. Naturally, in the first configuration of the second guide element (34), the active surface (37) and the blades (38) are not in contact with the fodder.

The elastically deformable element (42) is also disposed so as to create another torque so that, in the second configuration as shown in FIGS. 3 and 7, the second guide element (34) buts against another abutment not shown. Thus the elastically deformable element (42) makes it possible to hold the second guide element (34) stable in the second configuration. In the exemplary embodiment shown, the elastically deformable element (42) is a draw-spring. It will be noted that, in FIGS. 2 and 3, the draw-spring has been represented symbolically.

The second control member (44) is intended to pivot the second guide element (34) in the various configurations.

In the exemplary embodiment represented in FIGS. 2 and 3, the second control member (44) consists of a lever (43) which is advantageously disposed outside the casing (9). The lever (43) is rigidly connected to a shaft disposed along the axis (36) and supporting the second guide element (34). Thus, in the light of FIG. 3, the pivoting of the lever (43) causes the second guide element (34) to pivot about the articulation (35).

Preferably, the elastically deformable element (42) is also disposed outside the casing (9). The elastically deformable element (42) is then connected on one hand to the casing (9) and on another hand to the lever (43).

The agricultural mower (4) that has just been described is only an exemplary embodiment which should in no circumstances limit the field of protection defined by the following claims.

Thus, according to another exemplary embodiment not represented, the link (39) may be made by means of elements connecting the first control member (24) and the second control member (44), so as to have an adequate movement of the second guide element (34) when the first guide element (19) is adjusted.

According to another exemplary embodiment, the second guide element (34) is connected pivotingly by means of the articulation (35), not to the casing (9), but to the first guide element (19).

According to yet another exemplary embodiment, the axis (36) of the articulation (35) is coincident with the axis (23) of the articulation (22).

The device for processing fodder (8) according to the present invention may also be fitted to an agricultural machine comprising no cutting device (4). Such a machine then comprises a device for picking up the already cut fodder lying on the ground.

The invention claimed is:

1. A device for processing fodder comprising:
   a casing provided with an inlet section and an outlet section for the fodder;
   a rotor connected to the casing, so as to be driven in rotation about a longitudinal axis to transport the fodder toward the outlet section;
   a first guide element partially surrounding the rotor so as to define a passage channel for the fodder; and
   a second guide element disposed so as to guide flow of fodder leaving the passage channel, the second guide element configured to be disposed in at least two configurations relative to the rotor;
   a first control member configured to move the first guide element into at least two positions relative to the rotor and to hold the first guide element in the at least two positions;
   a link provided between the first guide element and the second guide element, so that a change of position of the first guide element modifies, in its first configuration, the position of the second guide element; and
   a second control member configured to dispose the second guide element according to the at least two configurations.

2. A device for processing fodder as claimed in claim 1, wherein the first guide element is connected pivotingly to the casing by an articulation with an axis situated in the rear portion of the guide element, wherein the axis is substantially parallel to the axis of rotation of the rotor and is disposed at the rear of the axis of rotation.

3. A device for processing fodder as claimed in claim 2, further comprising a comb articulated on an axis integral with the first guide element, the comb configured to engage at least partially in the passage channel.

4. A device for processing fodder as claimed in claim 2, wherein the second guide element is connected pivotingly to the casing by an articulation with an axis parallel to the axis of rotation of the rotor.

5. A device for processing fodder as claimed in claim 2, wherein the second guide element is connected pivotingly to the first guide element by an articulation with a shaft parallel to the axis of rotation of the rotor.

6. A device for processing fodder as claimed in claim 4, wherein the articulation is situated in a rear portion of the second guide element.

7. A device for processing fodder as claimed in claim 5, wherein the articulation is situated in a rear portion of the second guide element.

8. A device for processing fodder as claimed in claim 4, wherein the axis of the articulation connecting the second guide element to the casing is coincident with the axis of the articulation connecting the first guide element to the casing.

9. A device for processing fodder as claimed in claim 5, wherein the axis of the articulation connecting the second guide element to the first guide element is coincident with the axis of the articulation connecting the first guide element to the casing.

10. A device for processing fodder as claimed in claim 1, wherein the link is made by abutting and holding the second guide element against the first guide element.

11. A device for processing fodder as claimed in claim 10, wherein the second guide element comprises a nose configured to press against a support made on the first guide element.

12. A device for processing fodder as claimed in claim 11, wherein the nose is held against the support by an elastically deformable element.

13. A device for processing fodder as claimed in claim 11, wherein the nose is disposed in a front portion of the second guide element.

14. A device for processing fodder as claimed in claim 11, wherein the support is situated in front of an articulation connecting the first guide element to the casing.

15. A device for processing fodder as claimed in claim 14, wherein the support is offset relative to an active surface of the first guide element, so as to come out of the passage channel.

16. A device for processing fodder as claimed in claim 7, wherein the elastically deformable element is connected to the casing and to a lever of the second control member.

17. An agricultural machine, comprising a device for processing fodder as claimed in claim 1.

18. An agricultural machine as claimed in claim 17, which is an agricultural mower further comprising a cutting device disposed in front of the device for processing fodder.

* * * * *